United States Patent [19]

Jorgensen et al.

[11] 4,336,000

[45] Jun. 22, 1982

[54] LIQUID DOSAGE PISTON PUMP

[75] Inventors: Hans Jørgensen, Vanløse; Ib O. Sinnerup, Copenhagen; Ole E. Danborg, Hørsholm, all of Denmark

[73] Assignee: Radiometer A/S, Copenhagen, Denmark

[21] Appl. No.: 108,659

[22] Filed: Dec. 31, 1979

[30] Foreign Application Priority Data

Jan. 3, 1979 [DK] Denmark ................................ 29/79

[51] Int. Cl.³ ....................... F04B 39/00; F04B 21/00; G01N 1/14

[52] U.S. Cl. ...................................... 417/53; 417/435; 417/503; 73/864.16; 73/425.6 P; 73/864.63

[58] Field of Search ........................ 73/425.6, 425.4 P; 417/435, 519, 503, 53, 54

[56] References Cited

U.S. PATENT DOCUMENTS

| | | | |
|---|---|---|---|
| 1,966,498 | 7/1934 | Gross | 417/519 |
| 3,042,981 | 7/1962 | DeLione | 417/503 |
| 3,684,409 | 8/1972 | Sanz | 417/519 |
| 3,848,470 | 11/1974 | Hargash | 73/425.6 |
| 4,136,708 | 1/1979 | Cosentino | 417/503 |
| 4,231,990 | 4/1980 | Jottier | 73/425.6 |

*Primary Examiner*—William L. Freeh

*Attorney, Agent, or Firm*—Robert E. Burns; Emmanuel J. Lobato; Bruce L. Adams

[57] ABSTRACT

The invention relates to a method of removing air or gas bubbles tending to collect in the "dead space" of a piston burette or another liquid dosage piston pump during operation thereof. The venting is performed by sucking a substantial volume of air into the pump cylinder in addition to a certain amount of liquid, and the air and part of the liquid within the pump cylinder is thereafter discharged therefrom. A piston dosage pump for carrying out this method comprises a valve mechanism by means of which the pump cylinder may be selectively communicated not only with a liquid inlet conduit and a liquid outlet conduit, but also with an air inlet passage.

19 Claims, 8 Drawing Figures

LIQUID DOSAGE PISTON PUMP

BACKGROUND OF THE INVENTION

1. Field of the Invention

The present invention relates to a method of removing gas or air bubbles from a liquid-containing cylinder chamber of a dosage piston pump, such as a piston burette.

2. Description of the Prior Art

Most liquids contain small amounts of air or gas in dissolved condition or in the form of small bubbles. Therefore, after a certain period of operation of burettes and other liquid dosage pumps greater or smaller air or gas bubbles may collect therein. Such air or gas bubbles are rather disadvantageous in liquid dosage piston pumps in which the metered amount of liquid is normally determined on the basis of the displacement movement of the piston. An air or gas bubble positioned within the cylinder space of the pump will to some extent expand during the suction stroke of the pump due to the reduced cylinder pressure, while the air bubble will become somewhat compressed during the pressure stroke. If part of the gas or air within the cylinder flows out therefrom together with the liquid during the pressure stroke the accuracy of the metering will be influenced in a disadvantageous manner, because the actual amount of liquid being pumped may be somewhat smaller than that determined on the basis of the piston movement. Furthermore, the resiliency of the air bubbles may cause that liquid continues to flow out from the cylinder a small period of time after termination of the pressure stroke, which is less convenient.

For the above reasons it is important that a dosage pump be vented at certain time intervals. When the cylinder of the dosage pump is positioned with a substantially vertical axis, venting of the cylinder may simply take place through a venting opening positioned at the upper point of the cylinder end wall and preferably above the points where the inlet and outlet conduits of the pump open into the cylinder space. When the cylinder is to be vented the normally closed venting opening is opened while the piston is moved upwardly, whereby possible air bubbles are removed from the cylinder space together with part of the liquid therein. For various reasons it may be desirable to arrange the dosage pump with a substantially horizontal cylinder axis. The pump may then be built into existing module cabinets together with appertaining accessory equipment in the form of driving and controlling devices, whereby the pump may be well protected and the pump and the accessory equipment belonging thereto may be given a more compact shape.

However, it has been found that it is much more difficult to vent the horizontally arranged cylinders of dosage pumps. Even when a venting opening has been formed in the upper part of the cylinder end wall the relatively small air bubbles in question will tend to adhere to the cylinder wall and the piston top, and when the piston is moved towards its top position it will be difficult to secure that all air bubbles flow out through the venting opening together with the liquid, because they often remain in the "dead space" of the pump when the piston has been moved to its top position. It has been proposed to remove the air bubbles by flushing the "dead space" with a liquid while the piston is in its top position. Such venting procedure is, however, relatively complicated and requires use of further accessory equipment for this flush process.

SUMMARY OF THE INVENTION

The present invention provides a method of the type described above in which the said venting or removal of air bubbles may be performed in a very simple manner.

Thus, the present invention provides a method of removing gas or air bubbles from a liquid-containing cylinder chamber of a dosage piston pump including a pump cylinder and a piston displaceable in said cylinder so as to define said cylinder chamber therein, said method comprising introducing an additional volume of gas or air into said cylinder chamber and subsequently discharging the total volume of gas or air and a certain amount of liquid therefrom.

It has paradoxally been found that it is easier to completely expell a relatively large volume of air from the pump cylinder than a relatively small volume of air in the form of one or more small air or gas bubbles. Consequently, according to the invention a relatively small volume of air or gas in the form of small bubbles contained in the pump cylinder when the piston is in its inner or top position may be vented from the cylinder by sucking an additional and substantially greater volume of air into the cylinder. Prior to, during, or after sucking of the additional volume of air into the cylinder a certain amount of liquid at least sufficient to fill up the "dead space" of the dosage pump is also sucked into the cylinder. The air or gas bubbles initially contained within the pump cylinder will now unite themselves with the additional air volumes sucked into the cylinder so as to form a coherent air cushion in the upper part of the cylinder, and when the piston is thereafter moved towards its top position the total air volume will be expelled from the cylinder and the amount of liquid will fill up the "dead space" of the pump while a possible excessive amount is discharged from the cylinder when the total amount of air has been expelled therefrom. It has been found that the above procedure renders it possible to obtain a completely satisfactory venting of burettes and other dosage pumps even when the pump cylinders thereof are horizontally arranged.

Dosage pumps of the type described are normally provided with a liquid inlet conduit through which liquid is sucked into the cylinder during the suction strokes of the pump, and a liquid outlet conduit through which liquid is discharged during the pressure strokes of the pump. When the pump is provided with such conduits it is important to make sure that these conduits do not contain air bubbles or other accumulations of air. Therefore, according to the invention a liquid volume which is at least as large as the volume of the inner space of the inlet conduit may be sucked through the inlet conduit prior to the suction of air into the cylinder, and when the air has been expelled from the cylinder a liquid volume which is at least as large as the volume of the inner space of the outlet conduit may be sucked into the cylinder and thereafter discharged therefrom through the outlet conduit. As the liquid inlet conduit is vented prior to venting of the cylinder, and the liquid outlet conduit is vented after venting of the cylinder, the risk that air bubbles from the inlet conduit is sucked into the pump cylinder after venting thereof and that air bubbles are pumped from the pump cylinder into the liquid outlet conduit after venting of the same, is avoided. The discharge of air and the excessive amount of liquid from the pump cylinder is preferably made at a relatively low rate so as to secure time for suitable moistening of the cylinder surface as the interface between air and liquid is displaced within the cylinder, whereby the risk that some of the air remains in the cylinder is reduced.

The present invention also provides a liquid dosage piston pump comprising a pump cylinder, a piston defining a cylinder chamber in said cylinder and being movable through suction and pressure strokes, a valve device for communicating said cylinder chamber with a liquid inlet, a liquid outlet, or a gas inlet, and control means for controlling said valve device so as to communicate said cylinder chamber with said liquid inlet and said liquid outlet during said suction and pressure strokes, respectively, and with said gas inlet during part of a selective one of said suction strokes. When the pump cylinder is to be vented the valve device may be operated so as to communicate the cylinder with the liquid inlet conduit during part of the said selective suction stroke and with the atmosphere or a gas source during another part of said suction stroke. Air and liquid may then be expelled through the outlet conduit during the succeeding pressure strokes, in which the valve device closes the connection between the cylinder and the inlet conduit and between the cylinder and the atmosphere, while the cylinder is communicated with the liquid outlet conduit.

The piston surface defining the cylinder chamber is preferably concavely shaped with a sharp peripheral edge portion. The said piston surface will then pass smoothly into the cylinder wall whereby the risk that an air bubble becomes trapped between the peripheral edge of the piston and the end wall of the cylinder is substantially decreased.

In the present specification the expression "air" should not only comprise atmospheric air, but also any other type of gas or gas mixture.

BRIEF DESCRIPTION OF THE DRAWINGS

The invention will now be further described with reference to the drawings, wherein.

DESCRIPTION OF THE PREFERRED EMBODIMENT

Figure 1:
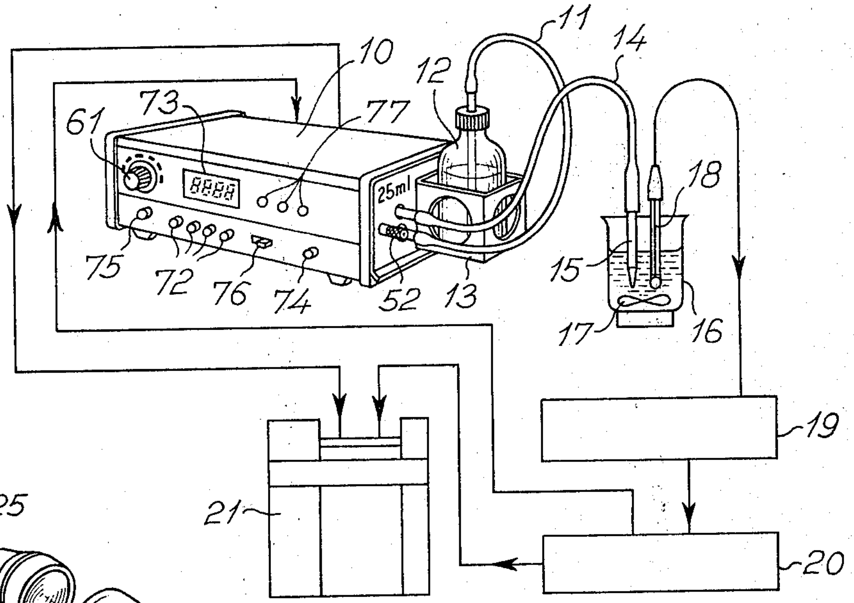
FIG. 1 is a titrimetric setup comprising a titration apparatus including an embodiment of the piston burette according to the invention.

FIG. 1 shows a titrimetric setup including an automatically operating titration apparatus 10 including an embodiment of the piston burette according to the invention and having an inlet conduit 11 through which a liquid titrant may be sucked from a titrant container 12 which is arranged in a holder 13. Metered amounts of the titrant may be supplied to a sample container 16 from the burette through an outlet conduit 14 including a glass tube 15 having a tapered free end. A suitable agitator 17, such as a magnetic agitator, may be arranged in the sample container 16 containing the sample or the liquid to be analyzed. The sample container 16 also contains a sensor 18, such as a pH-electrode, for sensing a change, such as a change in pH-value, taking place in the sample due to addition of titrant by means of the burette. As shown in FIG. 1 the sensor 18 may be electrically connected to an associated measuring apparatus 19, such as a so-called pH-meter, generating measuring signals which are supplied to an electric control unit 20 or so-called titrator. The output of this titrator is connected to a recording device 21 which is also connected to the apparatus 10. The control unit or titrator 20 is also connected to the apparatus 10 so that it may supply control signals thereto, and the titrator is adapted to automatically control the titration progress in accordance with a predetermined program. The recording device 21 is adapted to plot the measuring value, such as the pH-value of the sample, determined by the sensor 18 and the measuring apparatus 19 versus the volume of titrant supplied from the burette. From the graph plotted by the recording device 21 information about the sample in the container 16 may be derived in a known manner. It should be understood that the titration apparatus 10 may be used in connection with other setups than shown in FIG. 1.

Figure 3:
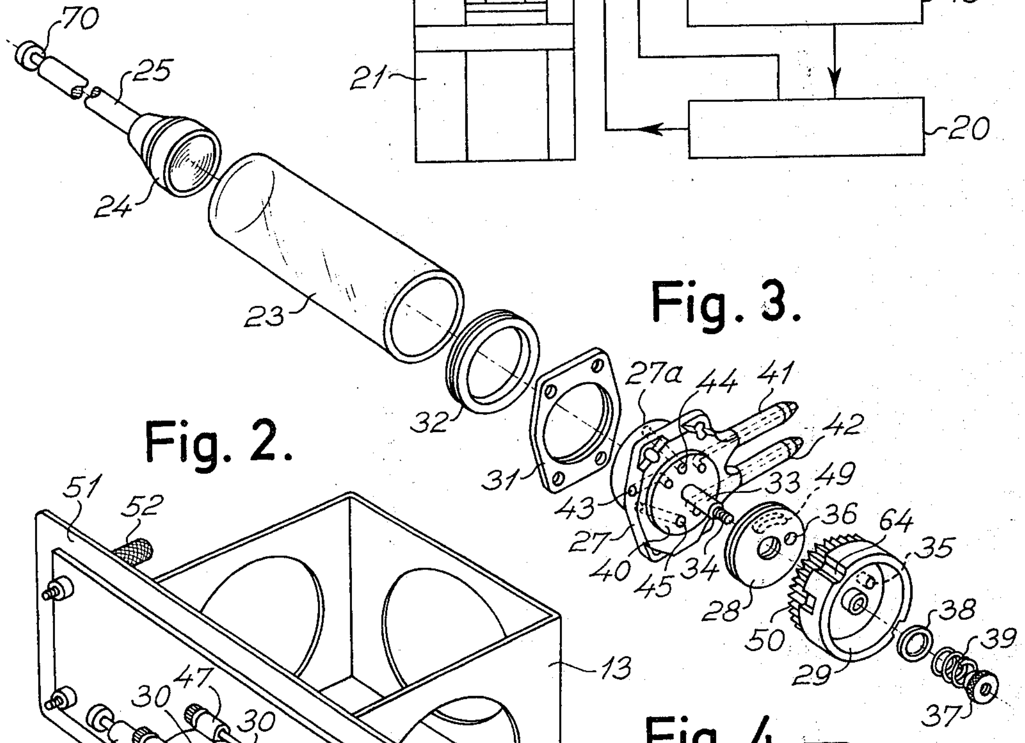
FIG. 3 is an exploded perspective view of the piston burette included in the burette unit shown in FIG. 2.
Figure 2:
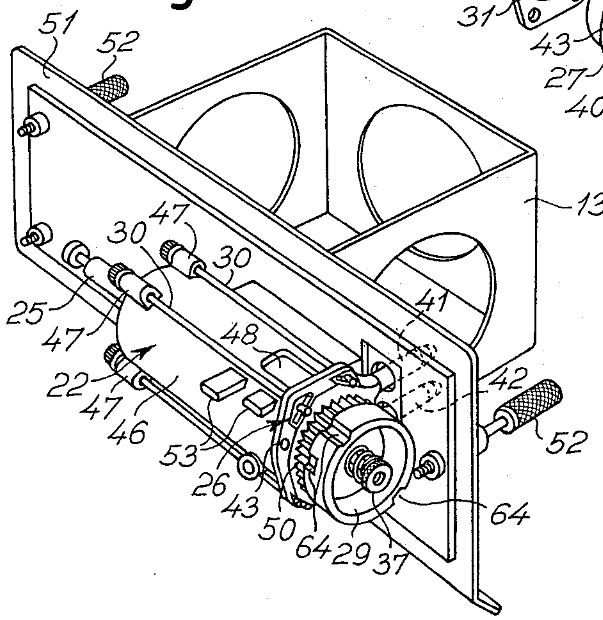
FIG. 2 is a perspective view in an enlarged scale of a replaceable burette unit forming part of the titration apparatus shown in FIG. 1.

The automatic titration apparatus 10 includes a piston burette or a piston pump 22 as that shown in FIGS. 2 and 3. As shown in FIG. 3 the piston burette comprises a cylinder 23 and a pertaining piston 24 arranged on a piston rod 25. The cylinder 23 is closed at one end by means of a valve device 26 including a stationary valve part 27, a rotatable disc-like valve member 28, and a valve driving member 29. The stationary valve part 27 has a cylindrical projection **27*a* which may be sealingly received in the adjacent end of the cylinder 23, and which is encircled by a spacing member 31 which is preferably made from metal, and by a sealing ring 32 which is, for example, made from rubber or plastic, and which sealingly abuts the end surface of the cylinder 23. The cylinder 23 is mounted in a cylinder housing 46 (FIG. 2) having projections 47 formed at one end and having cut-out or window 48 formed at its other end portion. The spacing member 31 and the valve part 27 form one end wall of the cylinder housing 46 and is kept tightened against the cylinder housing and against the end of the cylinder 23 received therein by means of bolts 30 extending through aligned bores in the projections 47, the spacing members 31, and the valve part 27**.

Figure 4:
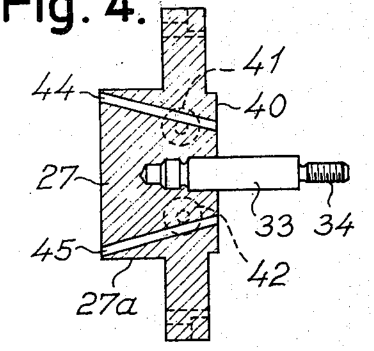
FIG. 4 is a partially sectional view in an enlarged scale of a stationary part of a burette valve.

The valve part 27 has a centrally extending stub shaft 33 having a threaded part 34 (FIG. 4) at its free end, and on which the valve member 28 and the valve driving member 29 are rotatably mounted. The valve driving member 29 is in driving connection with the valve member 28 by means of an excentric driving pin 35 extending into a corresponding depression or bore 36 in the valve member 28. The valve member 28 and the driving member 29 are biassed together and against the stationary valve part 27 by means of a coiled spring 39 arranged on the stub shaft 33 between a washer 38 and a nut 37 screwed on the treaded part 34 of the stub shaft.

As shown in FIG. 3 the stationary valve part 27 has formed therein five passages opening in a plane surface 40 engaging with the valve member 28, said passages opening into the surface 40 along a circle having its center on the axis of the stub shaft 33. The valve part 27 comprises an outlet pipe stub 41 and an inlet pipe stub 42 which are connected to the outlet conduit 14 and the inlet conduit 11, respectively, the bores of the said tube stubs forming two of said five passages. Of the remaining three passages one is an air inlet passage 43 communicating with the atmosphere while the two other passages are an outlet passage 44 and an inlet passage 45, respectively, both communicating with the inner space of the cylinder 23. The side surface of the valve member 28 engaging with the valve part 27 defines a groove or channel 49 formed as an arc of a circle having substantially the same radius as that of the circle on which the openings of the five passages in the surface 40 are positioned. The length of the groove 49 is such that it may connect two adjacent of the three upper or of the two lower (FIG. 3) of the passage openings into the surface 40. A toothed rim 50 is formed on the valve driving member 29 for driving this member 29 and consequently the valve member 28 as explained in the following.

As shown in FIG. 2 the piston burette 22 is mounted on the inner side of a wall 51 of a cabinet enclosing the titration apparatus. The holder 13 is also mounted on the inner side of that wall so that only the outlet and inlet pipe stubs 41 and 42 of the burette extend therethrough. The wall 51 and the piston burette 22 and the holder 13 mounted thereon constitute a replaceable burette unit which is shown in FIG. 2 and which may be mounted on the apparatus 10 shown in FIG. 1 by means of knurled thumbscrews 52 in such a manner that the axis of the burette cylinder 23 remains substantially horizontal. In connection with the apparatus 10 shown in FIG. 1 burette units with burettes of different sizes may be used, for example three burette sizes with stroke volumes of 2.5 ml, 10 ml and 25 ml, respectively. Two code projections 53 serve to identify in the automatic control circuit of the apparatus 10 the size of the burette mounted on the apparatus as will be further explained below. If, for example, three different burette sizes are available as mentioned above these may for example be provided with one long and one short, one short and one long, and two long code projections 53, respectively.

Figure 8:
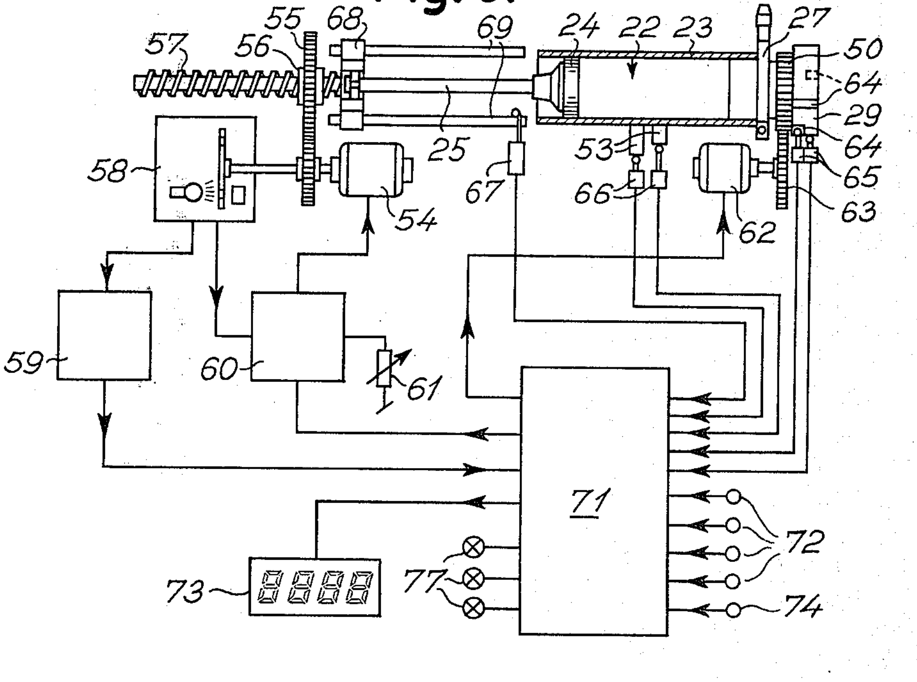
FIG. 8 is a block diagram of the titration apparatus shown in FIG. 1.

FIG. 8 shows a block diagram of the titration apparatus 10 shown in FIG. 1. As shown in FIG. 8 the piston movements of the burette 22 are generated by means of a driving motor 54 driving through the gearing 55 a rotatably, but not displaceably mounted nut 56 engaging with a piston rod extension member 57 provided with screw threads. As indicated in FIG. 8 a device 58 for indicating the rotational speed of the motor may, for example, comprise a disc having openings therein and mounted on the motor shaft and cooperating with a light source and with a photoelectric cell belonging thereto. The indicating device 58 is connected to a counter 59 which on the basis of the signals received from the device 58 may register the number of rotations of the motor, said number being a measure of the amount of titrant discharge through the pressure stroke of the burette. The indicating device 58 may further be connected to a motor control unit 60 for controlling the motor in accordance with the speed set by means of a manually adjustable speed adjusting device 61, vide FIGS. 1 and 8.

A further driving motor 62 serves to change the position of the valve device 26, a gear 63 mounted on the shaft of the motor engaging with the toothed rim 50. The valve member 28 is adapted to take up one of three different rotational positions in which the curved groove or channel 49 communicates the passages 43 and 44, the passage in the outlet pipe stub 41 and the passage 44, and the passage in the inlet pipe stub 42 and the passage 45, respectively, vide FIGS. 5 to 7. Thus in the first valve position (FIG. 7) communication is established between the atmosphere and the burette cylinder 23, in the second valve position (FIG. 6) communication is established between the burette cylinder and the outlet passage 14, and in the third valve position (FIG. 5) communication is established between the inlet conduit 11 and the burette cylinder. Corresponding to these three valve positions three different code recesses 64 are formed in the periphery of the valve driving member 29, and these recesses are adapted to cooperate with microswitches or sensors 65 serving to stop the motor 62 when the valve member 28 has been moved to the selected one of said three rotational positions. Also the code projections 53 are adapted to actuate microswitches or sensors 66. Furthermore, an end stop switch or sensor 67 is provided and may be actuated by a slide member 68 which is connected to the piston rod extension member 57 and which is slidable on stationary guide rods 69. When the burette unit shown in FIG. 2 is mounted on the apparatus 10 the piston rod 25 having an annular groove or channel 70 at its free end is brought into engagement with the slide member 68. When at the end of a pressure stroke the piston 24 reaches its end position or top position the slide member 68 actuates the switch or sensor 67.

As indicated above the functions of the apparatus 10 which is controlled by a built-in microcomputer 71 may be started either automatically by means of the titrator 20 or another control unit in accordance with a predetermined program, or by actuation of manually operatable program selectors 72 which may be arranged on the front panel of the apparatus 10 as shown in FIG. 1. By means of these program selectors for example the following functions may be initiated: emptying of the burette cylinder 23 at a rate set on the speed adjusting device 61, filling of the burette cylinder with titrant with maximum rate, venting of the burette cylinder and the conduits connected thereto in accordance with a program to be further explained below, and resetting to zero of a digital read-out unit 73 connected to the microcomputer 71. Furthermore the apparatus 10 is provided with a volume selector 74 by means of which the microcomputer 71 may be caused to reduce the volume of the burette cylinder by a factor of ten so that a burette for example having an actual volume of 2.5 ml is "converted" to a burette having a volume of 0.25 ml. Furthermore, the front panel of the apparatus 10 has mounted thereon an on-off switch 75, a selector switch 76 for selection of a manual or automatic refilling, and control lamps 77 indicating the operational condition of the apparatus. The signals from the switches or sensors 65, 66, and 67 are supplied to the microcomputer 71 controlling the movement of the piston 24 and the valve member 28 on the basis of these signals and signals received either from the titrator 20 or from the program selectors 72 and from the other manually operatable switches on the front panel of the apparatus. During operation the digital read-out unit 73 may indicate the amount of titrant metered by the burette calculated on the basis of the information which the microcomputer 71 receives from the sensor 66 and from the counter 59 regarding the size of the burette cylinder and the number of rotations of the motor 54, respectively, and thereby regarding the length of the piston movement.

Figure 5:
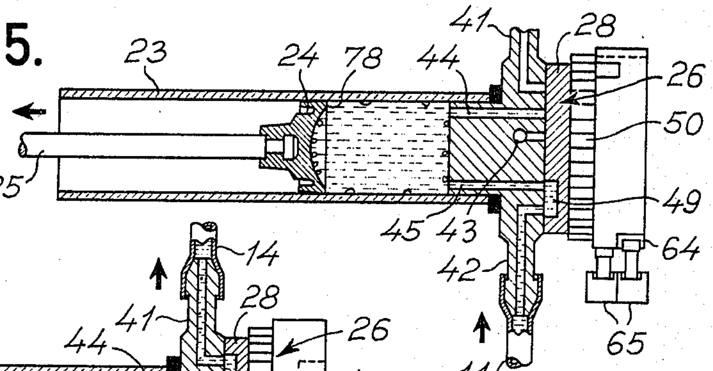
FIGS. 5 to 7 illustrate diagrammatically various steps of a burette venting operation.
Figure 6:
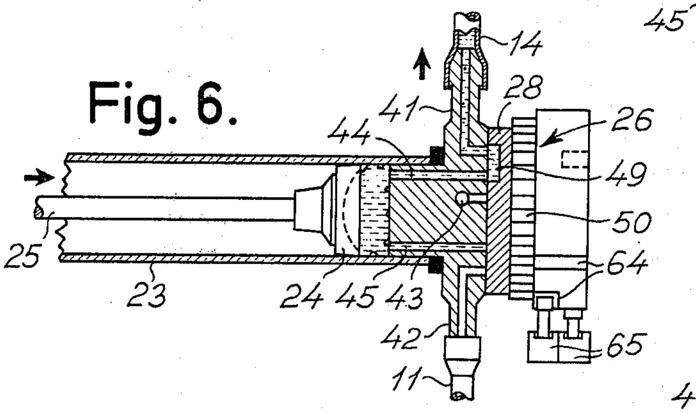
Figure 7:
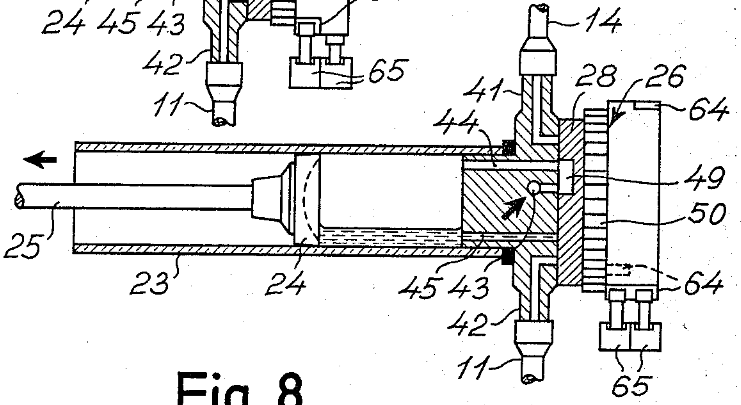

Before taking the titration apparatus 10 into use after a longer period of non-use, or after having used the apparatus in a longer period of time it is expedient to vent the burette cylinder 23 and the conduits 11 and 14 connected thereto, i.e. to remove possible gas or air bubbles therefrom. Such venting may be initiated by actuating the relevant program selector 72. The venting operation will then be automatically controlled by the microcomputer 71 in accordance with a predetermined program which will be further described with reference to FIGS. 5 and 7 diagrammatically showing sectional views of the cylinder 23 and the valve device 26. If the piston 24 is not already in its top position it is moved to that position while the valve member 28 is in its above mentioned second position in which the outlet conduit 14 is communicating with the inner space of the burette cylinder 23. When the piston 24 is in its inner position or top position within the cylinder the valve member 28 is rotated by the motor 62 to its above mentioned third position in which the inlet conduit 11 is communicating with the inlet passage 45 as shown in FIG. 5, and the piston 24 is now moved towards its bottom position by means of the motor 54. The piston 24 is moved with such a suitably low rate that titrant is sucked from the container 12 into the inlet conduit 11 at a suitably low linear speed, for example in the order of 8 cm/second, and the piston is moved at least along such a length that the total inlet conduit 11 plus part of the burette cylinder 23 is filled with fresh liquid. The valve member 28 is now rotated by the motor 62 to the above mentioned second position in which the outlet passage 44 communicates with the outlet pipe stub 41 as shown in FIG. 6, and the motor 54 then moves the piston 24 to its top position, whereby titrant liquid is discharged from the burette cylinder 23 through the outlet conduit 14. It is thereby obtained that the previous titrant liquid and possible disturbing gas or air bubbles are removed from the inlet conduit 11 which has been refilled with fresh airless titrant. While the piston 24 is in its top position the motor 62 rotates the valve member 28 to its above mentioned third position shown in FIG. 5, and the piston 24 is moved a very short length, for example 1 mm, in the direction towards the bottom position of the piston, whereby a small amount of titrant is sucked into the burette cylinder. Thereafter the motor 62 rotates the valve member 28 to the above mentioned first position which is shown in FIG. 7 and in which the air inlet passage is communicating with the outlet passage 44. The inner space of the burette cylinder is now in direct communication with the atmosphere, and the motor 54 moves the piston 24 a further distance, for example 20 to 25 mm, backwards towards its bottom position, whereby a substantial amount of air is sucked into the burette cylinder 23 in addition to the liquid already sucked into the cylinder. Possible gas or air bubbles present within the burette cylinder prior to said suction of air will now become united with the greater air volume. By means of the motor 62 the valve member 28 is now rotated to its second position shown in FIG. 6, and the piston 24 is moved by the motor 54 at an especially low rate towards its top position, whereby first the air and thereafter the liquid will be discharged from the burette cylinder through the outlet passage 44 opening into the uppermost part of the burette cylinder. When the burette cylinder 23 itself has been vented in that manner the valve member 28 is rotated to its third position shown in FIG. 5, and the motor 54 moves the piston 24 backwards towards its bottom position till a volume of titrant exceeding the volume which may be contained in the outlet conduit 14 has been sucked into the burette cylinder. The valve member is now rotated to its second position shown in FIG. 6, and the airless amount of titrant sucked into the burette cylinder is now caused to flow out through the outlet conduit 14 by moving the piston 24 to its top position at a suitably low rate. Also the outlet conduit 14 and the glass tube 15 have now been vented and refilled with airless titrant. The valve member may then again be rotated to its third position shown in FIG. 5 and the piston 24 may be moved to its bottom position so that the burette cylinder 23 is filled with liquid. Thereafter, the valve member 28 may once more be moved to its second position in which the outlet passage 44 is communicating with the outlet conduit 14. The apparatus 10 is now ready for titration which may be indicated thereby that one of the control lamps 77 is alight.

The burette cylinder 23 and the valve member 28 are preferably made from glass, for example boron silicate glass which is an alkali-resistant type of glass. The piston 24 is preferably made from plastic, for example Hoechst polyethylene, blow quality GF 4760 66° shore D, and in order to reduce the tendency of adherence of air to the piston 24 the top surface thereof is preferably polished, and in the preferred embodiment of the piston the said top surface thereof has such a concave shape that a sharp peripheral edge 78 is formed thereon, vide FIG. 5. The stationary valve part 27 is preferably made from tetrafluorethylene copolymer which is marketed under the name "Tefzel 200, " and the valve driving member 29 may be made from polypropylene, preferably of the type marketed under the name "PP-Hostalen PPN-VP 9790 GV 1."

In the foregoing the present invention has primarily been explained in connection with an automatic piston burette. It should be understood however, that the principle of the invention could also be used in connection with other types of dosage pumps whether automatic, semi-automatic, or manually operated.

We claim:

1. A method of removing gas or air bubbles from a liquid-containing cylinder chamber of a dosage piston pump including a pump cylinder and a piston displaceable in said cylinder so as to define said cylinder chamber therein, said method comprising introducing an additional, substantially greater volume of gas or air into said cylinder chamber for uniting said gas or air bubbles and said additional gas or air volume into a coherent total gas or air volume, subsequently discharging said coherent total volume of gas or air completely from said chamber as a substantially continuous gas flow, and introducing liquid into said cylinder chamber so as to obtain a cylinder chamber filled with liquid free of air or gas.

2. A method according to claim 1,
wherein said dosage piston pump is a piston burette.

3. A method according to claim 1, wherein said total volume of gas or air is discharged at a reduced rate.

4. A method according to claim 1,
wherein said cylinder chamber is communicating with a liquid outlet conduit and with a liquid reservoir through a liquid inlet conduit, said method further comprising sucking a first volume of liquid into said cylinder chamber through said inlet conduit and discharging said first volume of liquid through said outlet conduit prior to introducing said additional volume of gas or air into the cylinder chamber, said first liquid volume being at least as large as the volume of the inner space of the inlet conduit.

5. A method according to claim 3, further comprising sucking a second volume of liquid into said cylinder chamber through said inlet conduit after having discharged said amount of gas or air through said outlet conduit, and discharging said second liquid volume through said outlet conduit, said second volume being at least as large as the volume of the inner space of said outlet conduit.

6. In a method of operating a dosage piston pump including a pump cylinder and a piston displaceable therein so as to define a cylinder chamber communicating with liquid inlet and outlet conduits, said method comprising moving said piston through successive suction and pressure strokes so as to suck liquid into said cylinder chamber through said inlet conduit and to discharge metered amounts of liquid from said cylinder chamber through said outlet conduit, respectively, the improvement consisting in sucking a substantial volume of gas or air into said cylinder chamber during a selective one of said suction strokes for uniting said air or gas volume with possible gas or air bubbles present in said cylinder chamber into a coherent total air volume, and discharging said total coherent volume of gas or air as a substantially continuous gas flow and a certain amount of liquid from the cylinder chamber during the next pressure stroke so as to remove said gas or air bubbles from said cylinder chamber.

7. A method according to claim 6, wherein said dosage pump is a piston burette.

8. A method according to claim 7, further comprising sucking a first volume of liquid into said cylinder chamber through said inlet conduit and discharging said first volume of liquid through said outlet conduit during the suction and pressure strokes immediately preceding said selective suction stroke, said first liquid volume being at least as large as the volume of the inner space of the inlet conduit.

9. A method according to claim 8, further comprising sucking a second volume of liquid into said cylinder chamber through said inlet conduit and discharging said second liquid volume through said outlet conduit during the suction and pressure strokes immediately succeeding said next pressure stroke, said second liquid volume being at least as large as the volume of the inner space of said outlet conduit.

10. A method according to claim 9, wherein the piston is moved at a reduced rate during said selective suction stroke, and said next pressure stroke.

11. A liquid dosage piston pump comprising
a pump cylinder,
a piston defining a cylinder chamber in said cylinder and being moveable therein through suction and pressure strokes,
a valve device for communicating said cylinder chamber with a liquid inlet, a liquid outlet, or a gas inlet,
and control means for controlling said valve device so as to communicate said cylinder chamber with said liquid inlet and said liquid outlet during said suction and pressure strokes, respectively, and with said gas inlet during part of a selected one of said suction strokes.

12. A liquid dosage pump according to claim 11, wherein the piston surface defining said cylinder chamber is concavely shaped with a sharp peripheral edge portion.

13. A liquid dosage pump according to claim 11 which is a piston burette.

14. A liquid dosage pump according to claim 13, further comprising a control device for controlling the movements of said piston and said valve device.

15. Apparatus for dispensing a metered amount of a fluid comprising, a metering cylinder having a piston reciprocable therein, means for reciprocably driving the piston alternately in suction and pressure strokes; programmable means for purging of air from the metering cylinder prior to dispensing of liquid from the metering cylinder comprising, means to place the metering cylinder in communication with the atmosphere and effecting a partial suction stroke to take in a volume of air into the cylinder and mixing it with whatever air and air bubbles are present in the cylinder, said volume being less than the internal volume of the cylinder within which liquid is received and dispensed, and immediately thereafter effecting a pressure stroke to expell all the air from the cylinder; and means for subsequently effecting a suction stroke while communicating the cylinder with a source of fluid; and means subsequently effecting a pressure stroke and dispensing a metered volume of liquid from the cylinder.

16. A method of purging bubbles of a gaseous fluid in a cylinder of a liquid dispensing device to avoid entrainment of gaseous fluid in the liquid to be dispensed by the device, the device having a cylinder and a piston operable reciprocably in the cylinder, the method comprising, displacing the piston in a suction stroke while the cylinder is in communication with the source of gaseous fluid to draw into the cylinder a volume of gaseous fluid less than the total volume displacement of a suction stroke when liquid to be dispensed is drawn into the cylinder for dispensing therefrom under control of the piston and mixing in a mixture the volume of gaseous fluid with the gaseous fluid present in the cylinder, prior to the last-mentioned suction stroke interrupting communication between the cylinder and the source of gaseous fluid and placing a discharge outlet in communication with the cylinder and displacing the piston in a pressure stroke to expell the whole mixture of gaseous fluid from the cylinder through the discharge outlet, and immediately subsequent to the pressure stroke interrupting communication between the cylinder and the outlet, placing the cylinder in communication with an inlet to draw liquid from a source of liquid and actuating the piston in a full suction stroke to draw into the cylinder the liquid to be dispensed, at the end of the last-mentioned suction stroke interrupting communication between the source of liquid and the cylinder, and displacing the piston in a pressure stroke while the discharge outlet and the cylinder are in communication.

17. A method of purging gaseous fluid and bubbles thereof from a liquid dispensing device; prior to reuse of the device for dispensing of a liquid therefrom introducing into a cylinder of the device, from which the liquid is to be dispensed, a volume of a gaseous fluid and mixing it with any gaseous fluid and bubbles thereof within the cylinder to form a volume of the mixed gaseous fluids; developing within the cylinder mechanically pressure to expell the entire volume of mixed gaseous fluids, immediately after expelling the mixed gaseous fluids developing a partial vacuum mechanically within the cylinder and drawing a volume of liquid thereinto for dispensing of the liquid therefrom; and applying pressure mechanically internally of the cylinder to the volume of liquid and dispensing it therefrom free of entrained gaseous fluid and bubbles thereof.

18. A method of purging gaseous fluid and bubbles thereof from a liquid dispensing device according to claim 17, in which the volume of gaseous fluid introduced into the cylinder is a volume greater than gaseous fluid within the cylinder mixed therewith and is a volume smaller than the volume of liquid drawn into the cylinder for dispensing.

19. A method of purging gaseous fluid and bubbles thereof from a liquid dispensing device according to claim 18, in which a volume of the liquid to be dispensed smaller than the volume of liquid drawn into the cylinder for dispensing is introduced into the cylinder when said volume of gaseous fluid is introduced therein.

* * * * *